(12) United States Patent
Crombez et al.

(10) Patent No.: US 9,381,915 B1
(45) Date of Patent: Jul. 5, 2016

(54) VEHICLE SIDE IMPACT CONTROL

(71) Applicant: Ford Global Technologies, LLC, Dearborn, MI (US)

(72) Inventors: Dale Scott Crombez, Livonia, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/600,086

(22) Filed: Jan. 20, 2015

(51) Int. Cl.
*B60W 30/08* (2012.01)
*B60W 30/095* (2012.01)
*B60W 50/12* (2012.01)

(52) U.S. Cl.
CPC .............. *B60W 30/08* (2013.01); *B60W 30/095* (2013.01); *B60W 50/12* (2013.01)

(58) Field of Classification Search
CPC ...................... B60N 2/4235; B60R 2021/0006; B60R 21/0132; B60W 30/08; B60W 30/095; B60W 50/12
See application file for complete search history.

(56) References Cited

U.S. PATENT DOCUMENTS

| | | | |
|---|---|---|---|
| 6,721,659 B2 | 4/2004 | Stopczynski | |
| 7,613,568 B2 | 11/2009 | Kawasaki | |
| 8,812,226 B2 | 8/2014 | Zeng | |
| 2003/0011177 A1* | 1/2003 | Yasuhara et al. | ........... 280/730.2 |
| 2012/0130629 A1* | 5/2012 | Kim | ..................... B60W 30/085 |
| | | | 701/301 |
| 2012/0310484 A1* | 12/2012 | Higuchi | .......................... 701/46 |

FOREIGN PATENT DOCUMENTS

| | | |
|---|---|---|
| EP | 1526989 | 2/2004 |
| FR | 2909958 | 12/2006 |

* cited by examiner

*Primary Examiner* — Yuen Wong
(74) *Attorney, Agent, or Firm* — Frank A. MacKenzie; Bejin Bieneman PLC

(57) ABSTRACT

A vehicle system includes a sensor and a processing device. The sensor is configured to detect an impact vehicle. The processing device is programmed to predict an impact zone, define a passenger zone relative to a host vehicle, and generate a control signal to move the impact zone away from the passenger zone. The passenger zone is defined at least in part on a location of at least one occupant inside the host vehicle.

17 Claims, 4 Drawing Sheets

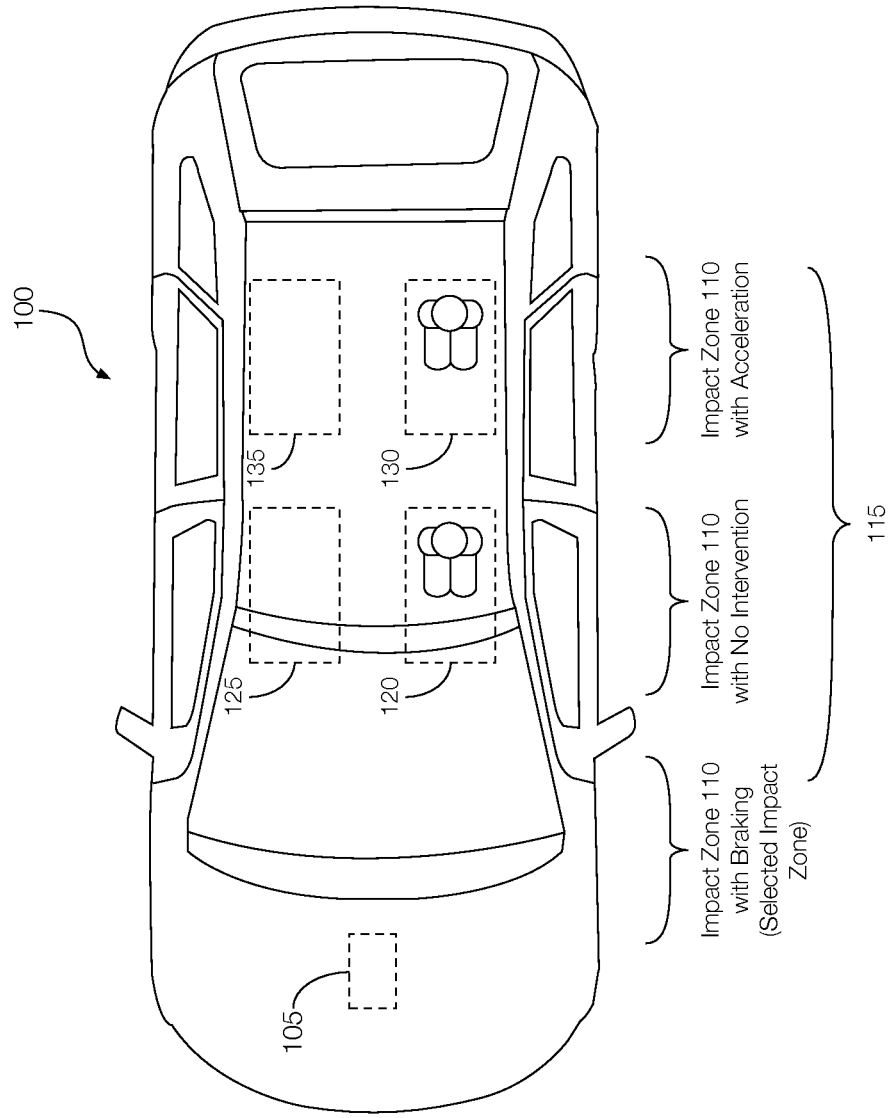

VEHICLE SIDE IMPACT CONTROL

BACKGROUND

Vehicles include various restraint systems to reduce the risk of harm to occupants in the event of a collision. Examples of common restraint devices include seatbelts and airbags. During a collision, seatbelts seek to hold passengers in their respective seats while airbags seek to cushion passengers from impacting certain parts of the vehicle interior. Vehicle body design can also help minimize injury by diverting impact forces away from passengers.

BRIEF DESCRIPTION OF THE DRAWINGS

FIGS. 3A and 3B illustrate example scenarios of how the side impact control system may change an impact zone.

DETAILED DESCRIPTION

If an impact cannot be avoided, one way to reduce the risk of harm to occupants in the host vehicle is to divert the host vehicle so that the impact occurs at a location as far from the passenger compartment as possible. In the context of an unavoidable side impact, the host vehicle may incorporate a side impact control system that includes a sensor and a processing device. The sensor may detect an impact vehicle. The impact vehicle may include a vehicle that will imminently collide with the host vehicle. The processing device is programmed to predict an impact zone. The impact zone may be a location relative to the host vehicle where the impact vehicle is likely to collide with the host vehicle. The processing device may be further programmed to define a passenger zone relative to the host vehicle. The passenger zone may be based, at least in part, on where occupants are located in the passenger compartment of the host vehicle. For example, if the impact zone includes the driver's side of the host vehicle, the passenger zone may be limited to the area of the passenger compartment near the driver seat if no other passengers are present in the host vehicle. The passenger zone may be expanded to include the area of the passenger compartment near the driver seat and driver side rear seat if a passenger is present in the seat behind the driver seat. When the passenger zone has been defined, the side impact control system may generate a control signal that can divert the host vehicle to move the impact zone away from the passenger zone. Diverting the host vehicle may include accelerating or decelerating the host vehicle. While the side impact control system may not be able to cause the impact vehicle to completely avoid colliding with the host vehicle, the side impact control system may cause the impact to occur as far away from passengers of the host vehicle as possible.

The elements shown may take many different forms and include multiple and/or alternate components and facilities. The example components illustrated are not intended to be limiting. Indeed, additional or alternative components and/or implementations may be used.

Figure 1:
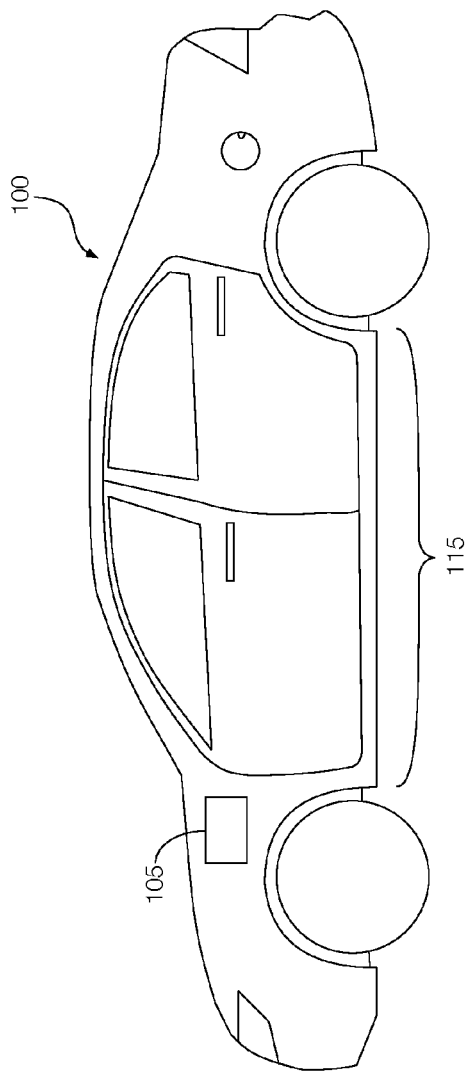
FIG. 1 illustrates an example host vehicle that incorporates a side impact control system.

As illustrated in FIG. 1, the host vehicle 100 includes a side impact control system 105 that detects an imminent impact with another vehicle (referred to as the "impact vehicle"). The term "imminent" may include impacts predicted to occur within, e.g., a few seconds. The side impact control system 105 may predict an impact zone 110 (see FIGS. 3A-3B) relative to the host vehicle 100. The impact zone 110 may refer to the location where the impact with the impact vehicle is most likely to occur. The impact zone 110 may be predicted based on, e.g., the speeds and trajectories of the host vehicle 100 and the impact vehicle.

The side impact control system 105 may further define a passenger zone 115. The passenger zone 115 may include all or parts of the passenger compartment of the host vehicle 100. Parts of the passenger compartment may include, e.g., a driver seat area 120 corresponding to a location of a driver seat in the host vehicle 100, a passenger seat area 125 (see FIGS. 3A-3B) corresponding to a location of a passenger seat in the host vehicle 100, a first rear seat area 130 corresponding to a location of a first rear seat (e.g., behind the driver seat) in the host vehicle 100, and a second rear seat area 135 (see FIGS. 3A-3B) corresponding to a location of a second rear seat (e.g., behind the front passenger seat) in the host vehicle 100. The passenger zone 115 may be defined to include any areas of the passenger compartment where an occupant is present. For instance, if the only occupant of the host vehicle 100 is sitting in the driver seat, the passenger zone 115 may be limited to the driver seat area 120. If occupants are identified in both the driver and front passenger seats, the passenger zone 115 may include the driver seat area 120 and the passenger seat area 125. If an occupant is identified in the rear seat behind the driver seat, the passenger zone 115 may include the first rear seat area 130. If an occupant is identified in the rear seat behind the front passenger seat, the passenger zone 115 may include the second rear seat area 135.

With the passenger zone 115 defined, the side impact control system 105 may generate a control signal that diverts the host vehicle 100 to move the impact zone 110 away from the passenger zone 115. Diverting the host vehicle 100 may include accelerating or decelerating the host vehicle 100. While the side impact control system 105 may not be able to cause the impact vehicle to completely avoid colliding with the host vehicle 100, the side impact control system 105 may cause the impact to occur as far away from passengers of the host vehicle 100 as possible.

The host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode or a partially autonomous mode.

Figure 2:
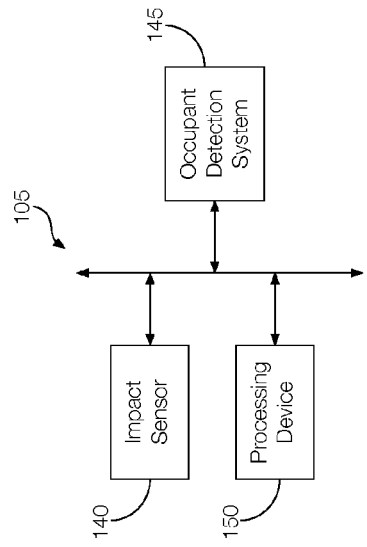
FIG. 2 is a block diagram showing example components of the side impact control system that may be incorporated into the vehicle of FIG. 1.

Referring now to FIG. 2, the side impact control system 105 may include an impact sensor 140, an occupant detection system 145, and a processing device 150.

The impact sensor 140 may include an electronic device that can detect the impact vehicle relative to the host vehicle 100. That is, the impact sensor 140 may be configured to detect an impact vehicle with a trajectory that is likely to collide with the host vehicle 100. Examples of such sensors 140 may include a radar sensor, a lidar sensor, a vision sensor, or the like. The impact sensor 140 may be configured to output a signal representing the presence of the impact vehicle, the trajectory of the impact vehicle, or both.

The occupant detection system 145 may include any number of devices configured to determine which seats of the host vehicle 100 are occupied. The occupant detection system 145, therefore, may include seat sensors, such as proximity sensors, associated with each seat in the passenger compartment. Each seat sensor may output a signal representing that an occupant has been detected. The absence of the signal may indicate that no occupant has been detected in the corresponding seat.

The processing device 150 may receive and process the signals generated by the impact sensor 140 and the occupant detection system 145. Thus, the processing device 150 may be programmed to predict the impact zone 110, define the passenger zone 115, and generate a control signal. The control signal may be used to move the host vehicle 100 so that the impact zone 110 is moved away from the passenger zone 115 since, as discussed above, the passenger zone 115 includes the locations of occupants within the host vehicle 100. The control signal generated by the processing device 150, therefore, may cause the host vehicle 100 to accelerate or decelerate since doing so would change the impact zone 110. In some possible implementations, such as when a collision in the passenger zone 115 is imminent and unavoidable, another control signal may be generated to prepare or pre-charge certain passive safety systems such as airbags, belt tensioners, or the like.

In determining whether to accelerate or decelerate the host vehicle 100, the processing device 150 may be programmed to evaluate certain powertrain and braking characteristics of the host vehicle 100. That is, the processing device 150 may be programmed to determine whether the powertrain of the host vehicle 100 can accelerate the host vehicle 100 fast enough to move the impact zone 110. Alternatively, the processing device 150 may be programmed to determine whether the braking system of the host vehicle 100 can decelerate the host vehicle 100 fast enough to move the impact zone 110.

In some implementations, the processing device 150 may be programmed to receive a driver input signal relating to the driver's intent for operating the host vehicle 100. The driver input signal may be generated in response to, e.g., the driver of the host vehicle 100 pressing the accelerator pedal or the brake pedal, or the driver turning the steering wheel. When an impact is imminent, the processing device 150 may be programmed to ignore or override certain driver input signals. For instance, the processing device 150 may ignore driver input signals that would keep the impact zone 110 within the passenger zone 115 or move the impact zone 110 to the passenger zone 115.

Figure 3B:
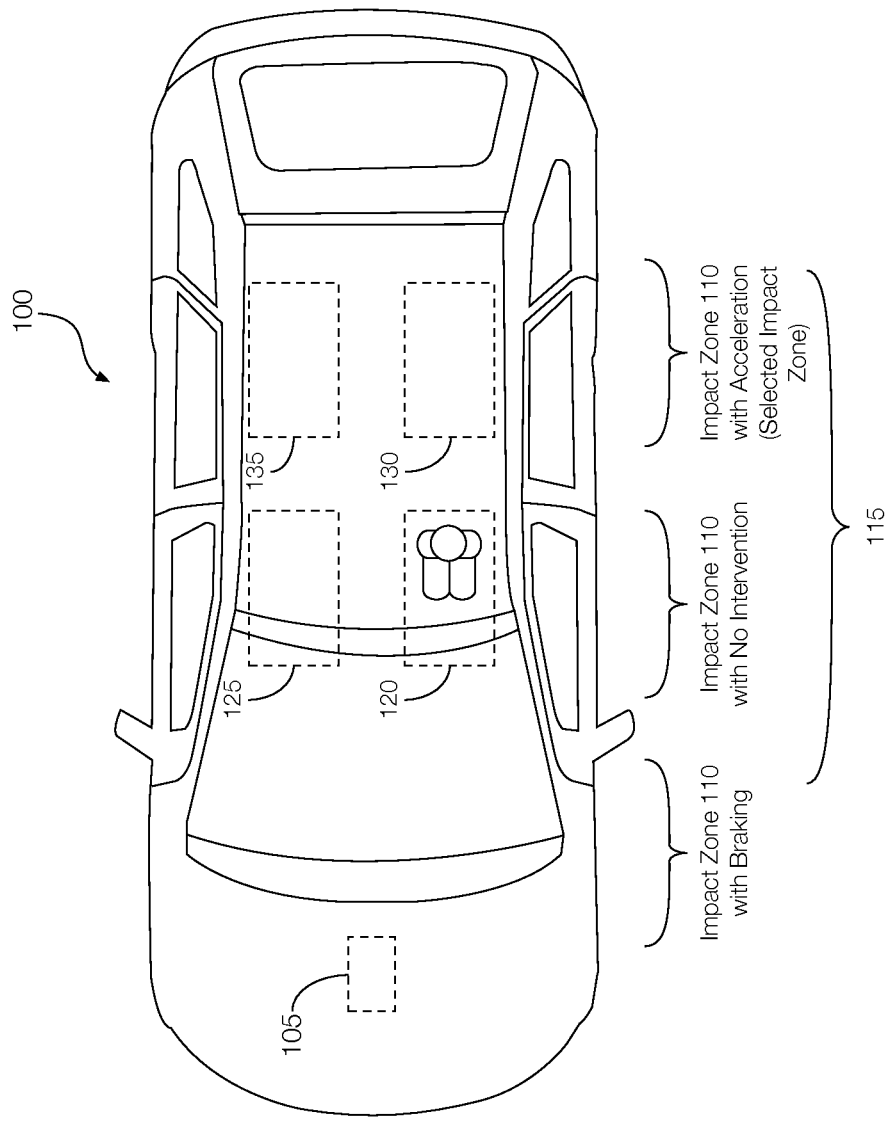

FIGS. 3A and 3B illustrate example scenarios of how the side impact control system 105 may move the impact zone 110 out of the passenger zone 115. As shown in FIG. 3A, the host vehicle 100 has two passengers—one in the driver seat and one in the rear seat behind the driver seat. Accordingly, the passenger zone 115 may be defined as including the driver seat area 120 and the first rear seat area 130. The impact zone 110 is initially predicted to occur near both the driver seat area 120 and the first rear seat area 130. The side impact control system 105 may further predict where the impact zone 110 will be if the host vehicle 100 were to accelerate or brake. In the example of FIG. 3A, accelerating will place the impact zone 110 close to the rear passenger. In other words, accelerating will not move the impact zone 110 away from the passenger zone 115. Rather, accelerating would move the impact zone 110 toward one of the passengers. Braking, however, will place the impact zone 110 in front of the passenger zone 115. Therefore, between accelerating and braking, the side impact control system 105 may control the host vehicle 100 to brake so that the impact may occur away from the passenger zone 115. Turning now to the example of FIG. 3B, where no rear passenger is present, both braking and accelerating will move the impact zone 110 away from the passenger zone 115. Accelerating, however, will move the impact zone 110 further from the only passenger. Therefore, the side impact control system 105 may control the host vehicle 100 to accelerate.

Figure 4:
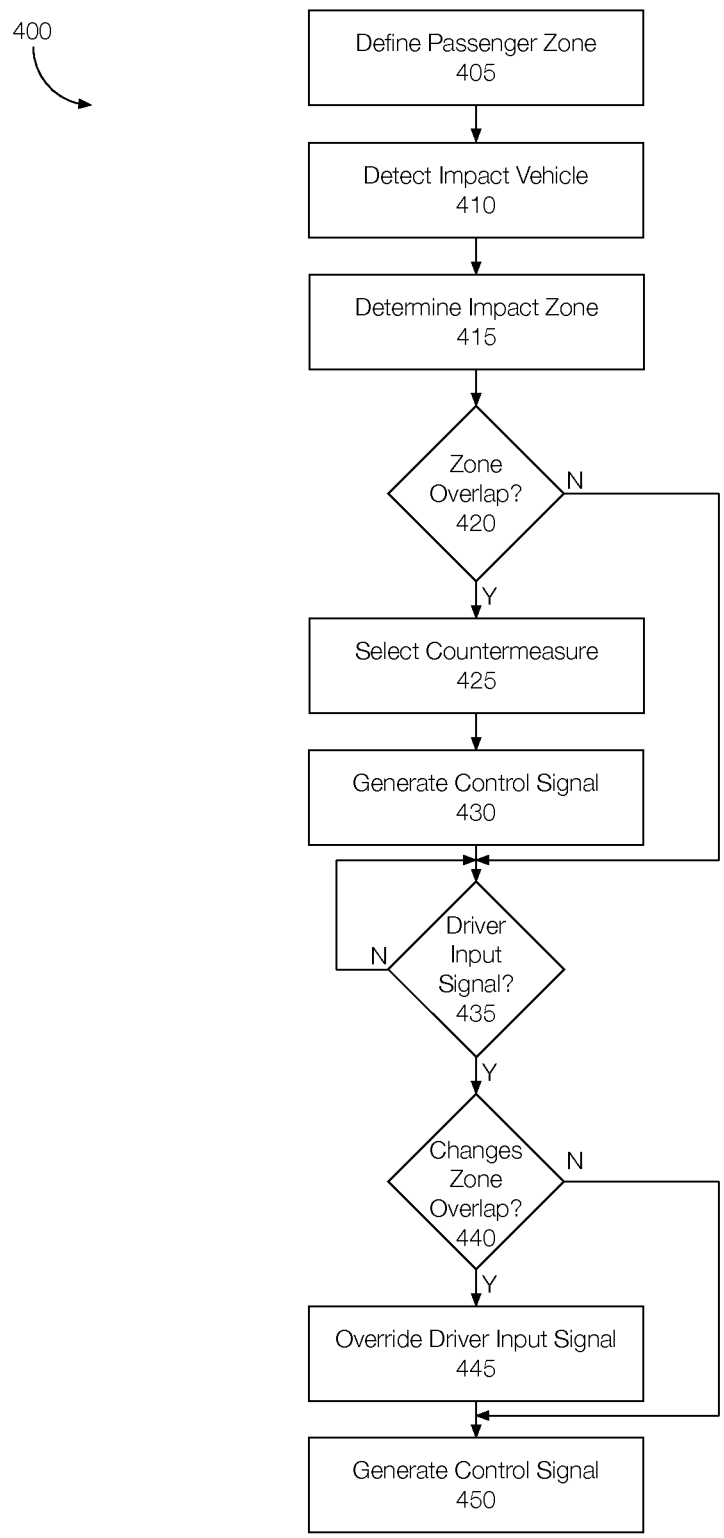
FIG. 4 is a flowchart of an example process that may be executed by the side impact control system.

FIG. 4 is a process flow diagram of an example process 400 that may be implemented by the side impact control system 105. The process 400 may begin when the host vehicle 100 is turned on and continue to run until the host vehicle 100 is turned off.

At block 405, the processing device 150 may define a passenger zone 115. The passenger zone 115 may be based on the location of occupants in the passenger compartment of the host vehicle 100. The locations of passengers may be determined from the signals output by the occupant detection system 145. As discussed above, the passenger zone 115 may include all or parts of the passenger compartment of the host vehicle 100. Parts of the passenger compartment may include the driver seat area 120 the passenger seat area 125 the first rear seat area 130 and the second rear seat area 135. If the only occupant of the host vehicle 100 is sitting in the driver seat, the passenger zone 115 may be limited to the driver seat area 120. If occupants are identified in both the driver and front passenger seats, the passenger zone 115 may include the driver seat area 120 and the passenger seat area 125. If an occupant is identified in the rear seat behind the driver seat, the passenger zone 115 may include the first rear seat area 130. If an occupant is identified in the rear seat behind the front passenger seat, the passenger zone 115 may include the second rear seat area 135.

At block 410, the processing device 150 may detect the impact vehicle. The impact vehicle may be detected from the impact signal output by the impact sensor 140, such as a radar sensor, a lidar sensor, a vision sensor, or the like. The impact signal may represent the presence of the impact vehicle, the trajectory of the impact vehicle, or both.

At block 415, the processing device 150 may determine the impact zone 110 relative to the host vehicle 100. The impact zone 110 may be determined from the speed of the host vehicle 100, and the speed and trajectory of the impact vehicle relative to the host vehicle 100.

At decision block 420, the processing device 150 may compare the impact zone 110 to the passenger zone 115. If the impact zone 110 is predicted to occur within the passenger zone 115, the process 400 may continue at block 425. Otherwise, the process 400 may proceed at block 435.

At block 425, the processing device 150 may select a countermeasure. Examples of countermeasures may include accelerating or decelerating the host vehicle 100. The processing device 150 may determine whether accelerating or decelerating the host vehicle 100 will cause the impact zone 110 to move away from the passenger zone 115. The processing device 150 may consider powertrain characteristics—e.g., how quickly the host vehicle 100 can accelerate—and braking characteristics—e.g., how quickly the host vehicle 100 can decelerate—in selecting the countermeasure. If both countermeasures are sufficient to move the impact zone 110 away from the passenger zone 115, or if moving the impact zone 110 out of the passenger zone 115 is impossible, the processing device 150 may select the countermeasure that places the impact zone 110 as far from the occupants as possible.

At block 430, the processing device 150 may generate a control signal. The control signal may be output to a vehicle control system that can cause the host vehicle 100 to implement the countermeasure. That is, the control signal may maneuver the host vehicle 100 in a way that moves the impact zone 110 away from the passenger zone 115 as much as possible. Thus, the control signal may cause the host vehicle 100 to accelerate or decelerate, among other countermeasures.

At decision block 435, the processing device 150 may determine whether a driver input signal has been received. The driver input signal may be generated by a driver input device such as the accelerator pedal, brake pedal, or steering wheel. If received, the process 400 may proceed to block 440. Otherwise, the process 400 may continue to execute block 435 until a driver input signal is received.

At decision block 440, the processing device 150 may determine whether the driver input signal will cause the impact zone 110 to move to, or stay within, the passenger zone 115. If the driver input signal will maneuver the host vehicle 100 in a manner contrary to the selected countermeasure or will cause the impact zone 110 to enter into the passenger zone 115, the process 400 may continue at block 445. Otherwise, the process 400 may continue at block 450.

At block 445, the processing device 150 may override the driver input signal. For instance, the processing device 150 may prevent the host vehicle 100 to responding in accordance with the driver input signal. Therefore, if the driver input signal would have the host vehicle 100 accelerate, but accelerating will move the impact zone 110 to within the passenger zone 115, the processing device 150 may override the driver input signal to prevent the host vehicle 100 from accelerating. Alternatively, if the driver input signal would have the host vehicle 100 decelerate, but decelerating will move the impact zone 110 to within the passenger zone 115, the processing device 150 may override the driver input signal to prevent the host vehicle 100 from decelerating.

At block 450, the processing device 150 may generate a control signal to operate the host vehicle 100 in accordance with the driver input signal.

The process 400 may end after blocks 445 or 450. If the collision with the impact vehicle is avoided, however, the process 400 may return to block 410 and so that the process 400 may continue to execute until the host vehicle 100 is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system, for use in a host vehicle, the vehicle system comprising:
   a sensor configured to detect an impact vehicle; and
   a processing device programmed to predict an initial impact zone defining an impact location relative to the host vehicle, define a passenger zone relative to the host vehicle, predict a plurality of future impact zones based on a simulated acceleration and deceleration of the host vehicle, select one of the plurality of future impact zones that moves the impact location furthest away from the passenger zone, and either accelerate or decelerate the host vehicle by actuating an accelerator pedal or a brake pedal, respectively, in accordance with the selected future impact zone to move the impact location furthest away from the passenger zone,
   wherein the passenger zone includes at least one area of a passenger compartment in the host vehicle with at least one detected occupant and excludes areas of the passenger compartment where no occupants are detected.

2. The vehicle system of claim 1, further comprising an occupant detection system configured to determine a location of the at least one occupant, wherein the processing device is programmed to define the passenger zone in accordance with a signal output by the occupant detection system.

3. The vehicle system of claim 1, wherein the processing device is programmed to generate a control signal to either accelerate or decelerate the host vehicle to move the impact zone away from the passenger zone.

4. The vehicle system of claim 1, wherein the passenger zone includes a driver seat area corresponding to a location of a driver seat in the host vehicle.

5. The vehicle system of claim 1, wherein the passenger zone includes at least one of a passenger seat area corresponding to a location of a passenger seat in the host vehicle, a first rear seat area corresponding to a location of a first rear seat in the host vehicle, and a second rear seat area corresponding to a location of a second rear seat in the host vehicle.

6. The vehicle system of claim 1, wherein the processing device is programmed to generate a control signal in accordance with a powertrain characteristic of the host vehicle.

7. The vehicle system of claim 1, wherein the processing device is programmed to generate a control signal in accordance with a braking characteristic of the host vehicle.

8. The vehicle system of claim 1, wherein the processing device is programmed to receive a driver input signal and determine whether the driver input signal controls the host vehicle to move the impact zone away from the passenger zone.

9. The vehicle system of claim 8, where in the processing device is programmed to override the driver input signal with the control signal in response to determining that the driver input signal controls the host vehicle to keep the impact zone inside of the passenger zone.

10. A method, for use in a host vehicle, the method comprising:
    detecting an impact vehicle;
    determining an initial impact zone defining an impact location relative to the host vehicle;
    defining a passenger zone relative to the host vehicle, wherein the passenger zone includes an area of a passenger compartment in the host vehicle with at least one detected occupant and excludes areas of the passenger compartment where no occupants are detected;
    predicting a plurality of future impact zones based on a simulated acceleration and deceleration of the host vehicle;
    selecting one of the plurality of future impact zones that moves the impact location furthest away from the passenger zone; and
    accelerating or decelerating the host vehicle by actuating an accelerator pedal or a brake pedal, respectively, in accordance with the selected future impact zone prior to the impact vehicle colliding with the host vehicle to move the impact location furthest away from the passenger zone.

11. The method of claim 10, further comprising determining a location of the at least one occupant inside the host vehicle.

12. The method of claim 10, further comprising generating a control signal to either accelerate or decelerate the host vehicle.

13. The method of claim 10, further comprising generating a control signal in accordance with at least one of a powertrain characteristic and a braking characteristic of the host vehicle.

14. The method of claim 10, further comprising:
    receiving a driver input signal; and
    determining whether the driver input signal controls the host vehicle to move the impact zone away from the passenger zone.

15. The method of claim 14, further comprising overriding the driver input signal with the control signal in response to determining that the driver input signal controls the host vehicle to keep the impact.

16. A vehicle system, for use in a host vehicle, the vehicle system comprising:
    an occupant detection system configured to determine a location in a passenger compartment of at least one occupant in the host vehicle;
    a sensor configured to detect an initial impact vehicle; and
    a processing device programmed to predict an impact zone defining an impact location relative to the host vehicle, define a passenger zone relative to the host vehicle in accordance with a signal output by the occupant detection system, predict a plurality of future impact zones based on a simulated acceleration and deceleration of the host vehicle, select one of the plurality of future impact zones that moves the impact location furthest away from the passenger zone, and either accelerate or decelerate the host vehicle by actuating an accelerator pedal or a brake pedal, respectively, in accordance with the selected future impact zone to move the impact location furthest away from the passenger zone, wherein the passenger zone includes at least one area of the passenger compartment in the host vehicle with at least one detected occupant and excludes areas of the passenger compartment where no occupants are detected, and wherein the processing device is programmed generate a control signal to either accelerate or decelerate the host vehicle and wherein the control signal is generated in accordance with at least one of a powertrain characteristic and a braking characteristic of the host vehicle.

17. The vehicle system of claim 16, wherein the passenger zone includes at least one of a driver seat area corresponding to a location of a driver seat in the host vehicle, a passenger seat area corresponding to a location of a passenger seat in the host vehicle, a first rear seat area corresponding to a location of a first rear seat in the host vehicle, and a second rear seat area corresponding to a location of a second rear seat in the host vehicle.

* * * * *